United States Patent
Yang et al.

(10) Patent No.: US 7,461,235 B2
(45) Date of Patent: Dec. 2, 2008

(54) ENERGY-EFFICIENT PARALLEL DATA PATH ARCHITECTURE FOR SELECTIVELY POWERING PROCESSING UNITS AND REGISTER FILES BASED ON INSTRUCTION TYPE

(75) Inventors: Yil Suk Yang, Daejeon (KR); Tae Moon Roh, Daejeon (KR); Dae Woo Lee, Daejeon (KR); Sang Heung Lee, Daejeon (KR); Jong Dae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 197 days.

(21) Appl. No.: 11/144,703

(22) Filed: Jun. 6, 2005

(65) Prior Publication Data

US 2006/0112258 A1    May 25, 2006

(30) Foreign Application Priority Data

Nov. 25, 2004    (KR) ...................... 10-2004-0097665

(51) Int. Cl.
*G06F 15/76* (2006.01)
*G06F 1/32* (2006.01)
(52) U.S. Cl. ........................................ 712/10; 713/324
(58) Field of Classification Search .................. 712/24, 712/208, 22, 10; 713/300, 324, 320
See application file for complete search history.

(56) References Cited

U.S. PATENT DOCUMENTS

| | | | |
|---|---|---|---|
| 5,737,631 A * | 4/1998 | Trimberger | 712/37 |
| 5,790,877 A * | 8/1998 | Nishiyama et al. | 713/323 |
| 6,205,543 B1 * | 3/2001 | Tremblay et al. | 712/228 |
| 6,219,796 B1 * | 4/2001 | Bartley | 713/320 |
| 6,256,743 B1 * | 7/2001 | Lin | 713/322 |
| 6,272,616 B1 * | 8/2001 | Fernando et al. | 712/20 |
| 6,446,191 B1 | 9/2002 | Pechanek et al. | |
| 6,760,832 B2 | 7/2004 | Nishimoto et al. | |
| 7,107,471 B2 * | 9/2006 | Feierbach | 713/324 |
| 2005/0050300 A1 * | 3/2005 | May et al. | 712/24 |
| 2005/0273569 A1 * | 12/2005 | Alba Pinto et al. | 711/203 |
| 2006/0168463 A1 * | 7/2006 | Terechko et al. | 713/324 |

FOREIGN PATENT DOCUMENTS

KR    1999-0007023    1/1999

OTHER PUBLICATIONS

Hennessy and Patterson, "Computer Architecture—A Quantitative Approach, 2nd Edition," 1996, pp. 127,130.*

* cited by examiner

*Primary Examiner*—David J Huisman
(74) *Attorney, Agent, or Firm*—Lowe Hauptman Ham & Berner, LLP

(57) ABSTRACT

Provided is a parallel data path architecture for high energy efficiency. In this architecture, a plurality of parallel process units and a plurality of function units of the process units are controlled by instructions and processed in parallel to improve performance. Also, since only necessary process units and function units are enabled, power dissipation is reduced to enhance energy efficiency. Further, by use of a simple instruction format, hardware can be programmed as the parallel data path architecture for high energy efficiency, which satisfies both excellent performance and low power dissipation, thus elevating hardware flexibility.

7 Claims, 4 Drawing Sheets

ENERGY-EFFICIENT PARALLEL DATA PATH ARCHITECTURE FOR SELECTIVELY POWERING PROCESSING UNITS AND REGISTER FILES BASED ON INSTRUCTION TYPE

CROSS-REFERENCE TO RELATED APPLICATION

This application claims priority to and the benefit of Korean Patent Application No. 2004-97665, filed Nov. 25, 2004, the disclosure of which is incorporated herein by reference in its entirety.

BACKGROUND

1. Field of the Invention

The present invention relates to a parallel data path architecture that improves the energy efficiency of a processor.

2. Discussion of Related Art

A data path is a very important block to operations and signal processing and determines the performance of a processor (MPU/MCU/DSP). In general, the data path is a block that executes a series of tasks, that is, processes data and reads and writes the processed data. For example, the data path reads/fetches, decodes, and executes instructions. In this connection, a lot of architectures have been proposed to improve the performance of processors. Above all, a parallel pipeline architecture is being widely employed because it can increase instruction per cycle (IPC) so as to improve the performance of the processors.

The parallel pipeline architecture, which is in common use to improve the performance of a data path of a processor (MPU/MCU/DSP), can be categorized into a single instruction multiple data (SIMD) architecture and a multiple instruction multiple data (MIMD) architecture. The SIMD architecture processes multiple data using a single instruction, whereas the MIMS architecture processes multiple data using multiple instructions. The SIMD architecture can be classified into a superscalar architecture, in which one or more instructions that can be concurrently executed are searched and executed during the operation of a processor, and a very long instruction word (VLIW) architecture, in which one or more instructions that can be concurrently executed are translated into a single long instruction by a compiler and the single long instruction is executed per cycle.

FIG. 1 is a block diagram of a conventional VLIW instruction format, and FIG. 2 is a block diagram of a data path architecture using the VLIW instruction format shown in FIG. 1. As shown in FIGS. 1 and 2, in a processor using the conventional VLIW instruction format, one or more instructions issued from a program memory 10 are compressed into a VLIW instruction, and the VLIW instruction is transmitted to a dispatch unit 12. The dispatch unit 12 extracts the VLIW instruction into individual instructions so that at least two execution units 14 and 16 can execute the individual instructions in parallel. The processor reads data from a data memory 18 or writes data in the data memory 18 according to the executed instructions. In this architecture, because the individual instructions, which are compressed into the VLIW instruction, need to be distinct from each other, the unit of processing instructions becomes complicated.

As described above, in the conventional VLIW architecture, since instructions are intricate and a decoder for decoding the instructions is complicated, hardware is also very complex. Also, in order to execute a very long instruction for a cycle, a highly efficient compiler is positively necessary.

Further, power dissipation increases because of hardware function units, which are not sufficiently utilized since it is difficult to make an applied program suitable for the VLIW architecture.

Similar to the conventional VLIW architecture, in a conventional superscalar architecture, as the number of parallel process units increases to improve performance, the number of hardware function units increases. Also, the hardware function units cannot be completely utilized with the application of instruction level parallelism (ILP), and power dissipation increases because of the inefficient hardware function units.

For the above-described reasons, the conventional SIMD superscalar architecture and SIMD VLIW architecture may improve the performance of a processor, but have the problem of very high power dissipation.

SUMMARY OF THE INVENTION

The present invention is directed to a parallel data path architecture for high energy efficiency, which improves the performance of a processor and also reduces power dissipation.

One aspect of the present invention is to provide a parallel data path architecture of a process unit array including a plurality of process units, and each of the process units includes an instruction register that receives a reset signal, synchronizes an instruction transmitted through an instruction bus with a first clock signal, and stores the instruction; an instruction decoder that receives the first clock signal and a second clock signal, decodes the instruction, and produces a first control signal, a second control signal, and a third control signal corresponding to the instruction; register files that receive the reset signal and select and control a register file corresponding to the decoded instruction in response to the first control signal; a load/store unit that receives the first and second clock signals, controls the transmission of data to and from an external memory connected to data buses in response to the second control signal, and transmits and receives data to and from the register files; and first through third operation logic units that are selectively enabled in response to the third control signal and transmit respective output signals to the register files.

The instruction decoder of each of the process units may include register file selection signals and register input signals, which are controlled by the instruction bus so that the external memory writes data in each of the register files and reads the data in each of the register files from the external memory.

The instruction decoder of each of the process units may include process unit selection signals and process unit input signals, which are controlled by the instruction bus so that one of the process units is selected and enabled according to the type of application.

Also, the first through third operation logic units may include an adder unit, a shifter unit, and a multiplier unit, and at least one of the first through third operation logic units may be selectively enabled by a combination of a plurality of operation logic control signals, which constitute the third control signal controlled by the instruction bus.

Further, each of the process units may include a data path architecture that is connected in parallel to the instruction bus and connected to the external memory through the data buses.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF EXEMPLARY EMBODIMENTS

The present invention will now be described more fully hereinafter with reference to the accompanying drawings, in which exemplary embodiments of the invention are shown. This invention may, however, be embodied in different forms and should not be construed as limited to the embodiments set forth herein. Rather, these embodiments are provided so that this disclosure is thorough and complete and fully conveys the scope of the invention to those skilled in the art.

Figure 1:
FIG. 1 is a block diagram of a conventional very long instruction word (VLIW) instruction format.
Figure 2:
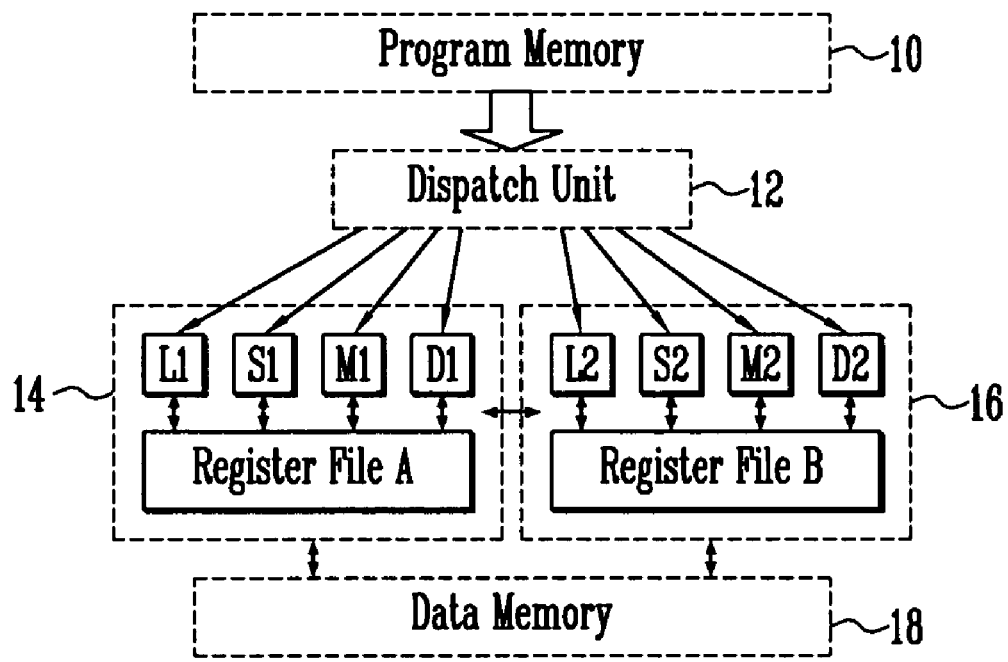
FIG. 2 is a block diagram of a data path architecture using the instruction format shown in FIG. 1.
Figure 3:
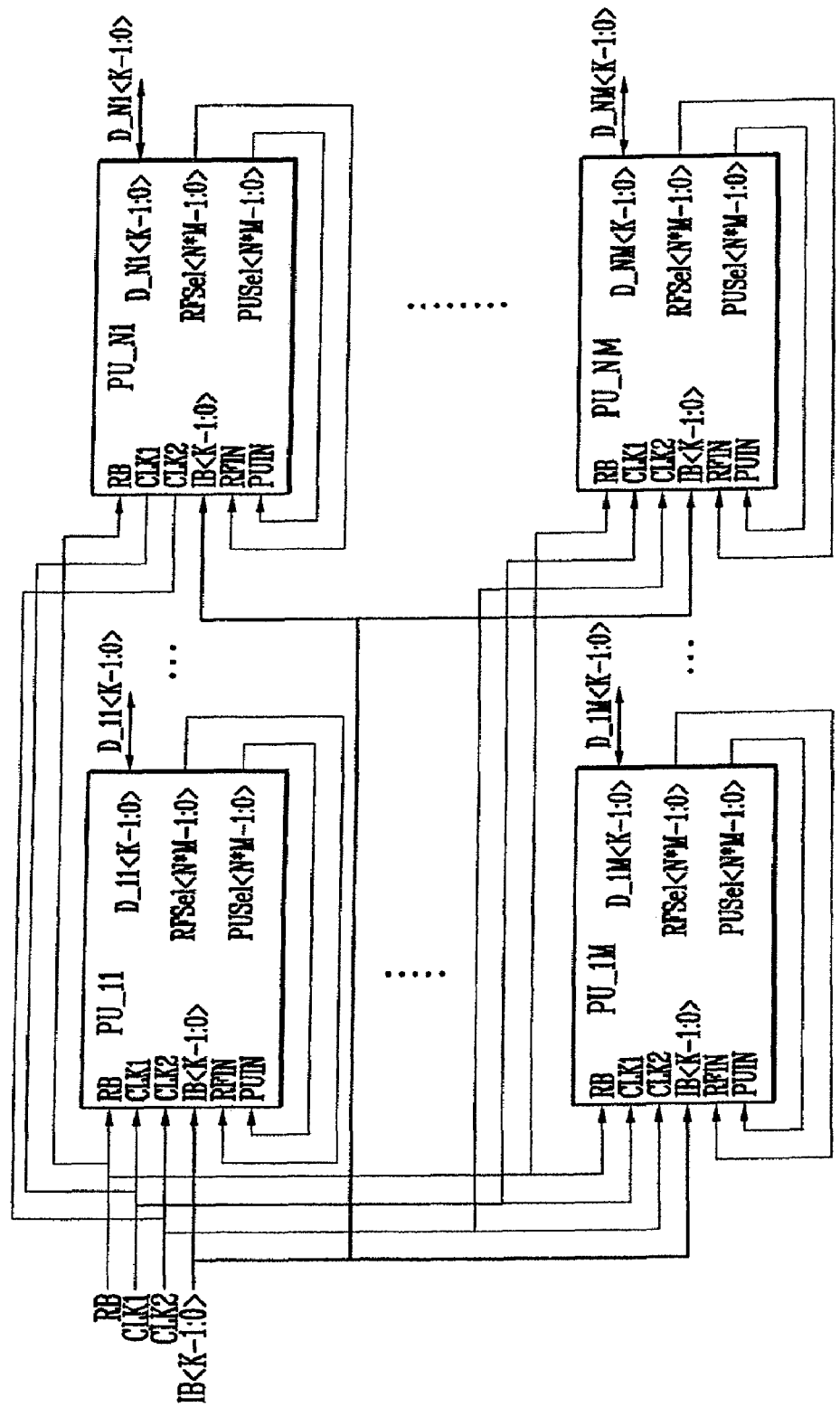
FIG. 3 is a block diagram of a parallel data path architecture according to an exemplary embodiment of the present invention.

FIG. 3 is a block diagram of a parallel data path architecture according to an exemplary embodiment of the present invention. In FIG. 3, as a matter of convenience, a process unit in a first row and a first column is denoted as reference character PU_11, a process unit in the first row and a last $N_{th}$ column is denoted as PU_N1, a process unit in a last $M_{th}$ row and the first column is denoted as PU_1M, and a process unit in the $M_{th}$ row and the $N_{th}$ column is denoted as PU_NM. Also, data buses connected to the process units PU_11, PU_N1, PU_1M, and PU_NM are denoted as D_11<K−1:0>, D_N1<K−1:0>, D_1M<K−1:0>, and D_NM<K−1:0>, respectively.

Referring to FIG. 3, the N×M parallel data path architecture for high energy efficiency includes an N×M array of a plurality of process units (PUs), which are connected in parallel to a single instruction bus IB<K−1:0>.

In the foregoing N×M PU array, each PU includes a reset signal RB, a first clock signal CLK1, a second clock signal CLK2, a K bit instruction bus IB<K−1:0>, K bit data buses D_NM<K−1:0> (here, each of N and M is an arbitrary natural number), register file selection signals RFSel<N×M−1:0>, PU selection signals PUSel<N×M−1:0>, register file selection input signals RFIN, and PU selection input signals PUIN.

Herein, the reset signal RB, the first clock signal CLK1, the second clock signal CLK2, the instruction bus IB<K−1:0>, the register file selection input signals RFIN, and the PU selection input signals PUIN are input signals, the register file selection signals RFSel<N×M−1:0> and the PU selection signals PUSel<N×M−1:0> are output signals, and the data buses D_11<K−1:0>, . . . , D_N1<K−1:0>, . . . , D_1M<K−1:0>, . . . , and D_NM<K−1:0> are input/output signals.

In the N×M PU array according to the present invention, the reset signal RB, the first clock signal CLK1, the second clock signal CLK2, the K bit instruction bus IB<K−1:0>, the N×M K bit data buses D_11<K−1:0>, . . . , and D_NM<K−1:0>, the N×M register file selection signals RFSel<N×M−1:0>, the PU selection signals PUSel<N×M−1:0>, the register file selection input signals RFIN, and the PU selection input signals PUIN are organically connected to one another.

Specifically, the reset signal RB is an input signal that initializes an initial register value and connected to all the N×M PUs. The first and second clock signals CLK1 and CLK2 are main clock signals required for the execution of the PUs and connected to all the N×M PUs. Every instruction is synchronized with the first and second clock signals CLK1 and CLK2 and executed for one cycle. Here, one cycle corresponds to the sum of time periods of the first and second clock signals CLK1 and CLK2.

The K bit instruction bus IB<K−1:0> is connected to all the PUs, which are controlled by K bit instructions. The parallel N×M PU array includes only one K bit instruction bus IB<K−1:0>.

The K bit data buses D_11<K−1:0>, . . . , and D_NM<K−1:0> are input/output signals for reading data from the PUs or writing data in the PUs and connected to the individual PUs on a one-to-one basis. In the present invention, data can be received from or transmitted to an external memory (not shown) only by means of the N×M K bit data buses D_11<K−1:0>, . . . , and D_NM<K−1:0>.

The register file selection signals RFSel<N×M−1:0> are required for independently reading data from the individual PUs and writing data in the PUs and controlled by the K bit instruction bus IB<K−1:0>. The register file selection input signals RFIN are input signals that receive one of the register file selection signals RFSel<N×M−1:0>, which is selected by the K bit instruction bus IB<K−1:0>. In the present invention, by using a combination of the register file selection signals RFSel<N×M−1:0> and the register file selection input signals RFIN, the external memory can write data in internal register of the N×M PUs and read the data in the internal register files of the N×M PUs from the external memory.

Hence, in the data path architecture according to the present invention, during access to the external memory, data is read or written through the N×M K bit data buses D_11<K−1:0>, . . . , and D_NM<K−1:0>, which are connected to the N×M PUs, respectively. In other words, the data path architecture according to the present invention corresponds to an SIMD architecture that processes multiple data in parallel using the same instruction. Accordingly, the data path architecture according to the present invention not only uses a simple instruction format, but also is highly compatible with type instruction of conventional reduced instruction set computing (RISC).

The PU selection signals PUSel<N×M−1:0> can select one of the N×M PUs and control the PU array. The PU selection signals PUSel<N×M−1:0> are controlled by the K bit instruction bus IB<K−1:0>. The PU selection input signals PUIN are input signals that receive one of the N×M PUs selection signals PUSel<N×M−1:0>, which is selected by the K bit instruction bus IB<K−1:0>. By using a combination of the PU selection signals PUSel<N×M−1:0> and the PU selection input signals PUIN, the N×M PU array can be controlled to determine needed PUs according to the type of application. In other words, the parallel data path architecture according to the present invention can enable all the N×M PUs or selectively enable only a desired PU, thereby reducing power dissipation.

Each of the PUs in the above-described PU array includes a plurality of function units (FUs). The construction of the PU will now be described in more detail with reference to FIG. 4.

Figure 4:
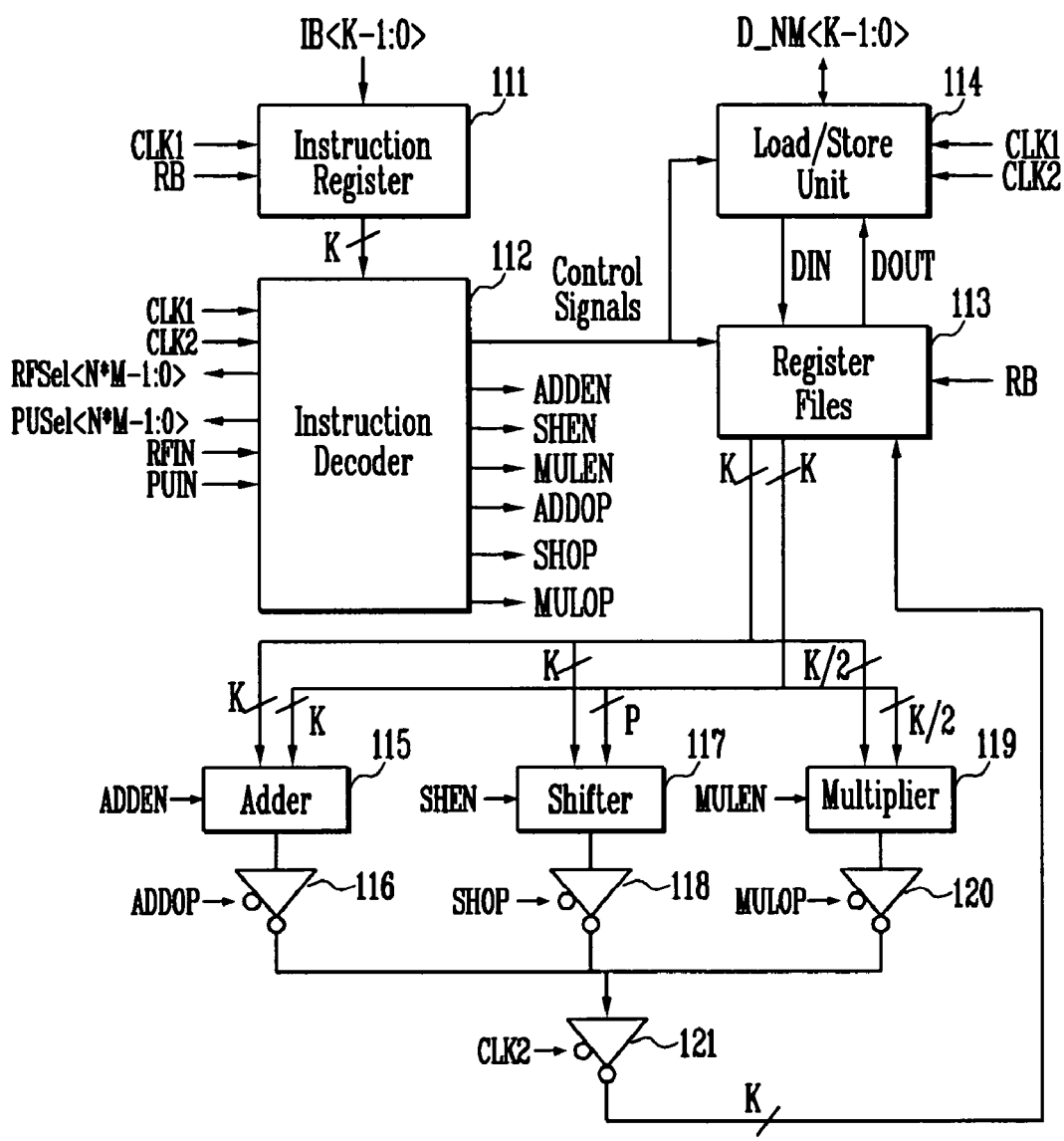
FIG. 4 is a block diagram of a process unit according to an exemplary embodiment of the present invention.

FIG. 4 is a block diagram of a process unit (PU) 110 according to an exemplary embodiment of the present invention.

Referring to FIG. 4, the PU 110 according to the present invention includes a reset signal RB, a first clock signal CLK1, a second clock signal CLK2, a K bit instruction bus IB<K−1:0>, K bit data buses D_NM<K−1:0> (here, each of N and M is an arbitrary natural number), register file selection signals RFSel<N×M−1:0>, PU selection signals PUSel<N× M−1:0>, register file selection input signals RFIN, PU selection input signals PUIN, and a plurality of operation logic control signals ADDEN, SHEN, MULEN, ADDOP, SHOP, and MULOP for controlling operation logic units.

Further, the PU 110 includes an instruction register 111, an instruction decoder 112, register files 113, an interface unit, i.e., a load/store unit 114, and the operation logic units.

Specifically, the instruction register 111 receives the reset signal RB and the first clock signal CLK1 and is connected to the K bit instruction bus IB<K−1:0>.

The instruction decoder 112 is connected to the instruction register 111 through the K bit bus. The instruction decoder 112 receives the first clock signal CLK1, the second clock signal CLK2, the register file selection input signals RFIN, and the PU selection input signal and produces and outputs a first control signal and a second control signal for controlling the register files 113 and the load/store unit 114 and a third control signal for controlling the operation logic units. Here, the third control signal includes the operation logic control signals ADDEN, SHEN, MULEN, ADDOP, SHOP, and MULOP to selectively enable a plurality of operation logics of the operation logic units.

Also, the instruction decoder 112 outputs the register file selection signals RFSel<N×M−1:0> and the PU selection signals PUSel<N×M−1:0> and receives the register file selection input signals RFIN and the PU selection input signals PUIN.

The K bit×L register files 113 receive the reset signal RB and the first control signal output from the instruction decoder 112, are connected to the operation logic units through buses having a width of K bit, K/2 bit, or variable bit (P), and receive signals output from the operation logic units. Also, the register files 113 are connected to the load/store unit 114 and transmit data to the load/store unit 114 and receive data from the load/store unit 114.

The load/store unit 114 receives the first and second clock signals CLK1 and CLK2 and the second control signal output from the instruction decoder 112 and is connected to the K bit data buses D_NM<K−1:0>, which are connected to an external memory.

The operation logic units include two or more operation logic units, at least a K bit adder 115, a K bit variable shifter 117, and a K/2 bit multiplier 119. The K bit adder 115 is controlled by an adder enable signal ADDEN output from the instruction decoder 112 and has an output terminal connected to an output buffer 116 and 121, which is controlled by an adder operation signal ADDOP output from the instruction decoder 112 and the second clock signal CLK2. The K bit variable shifter 117 is controlled by a shifter enable signal SHEN output from the instruction decoder 112 and has an output terminal connected to an output buffer 118 and 121, which is controlled by a shifter operation signal SHOP output from the instruction decoder 112 and the second clock signal CLK. The K/2 bit multiplier 119 is controlled by a multiplier enable signal MULEN output from the instruction decoder 112 and has an output terminal connected to an output buffer 120 and 121, which is controlled by a multiplier operation signal MULOP output from the instruction decoder 112 and the second clock signal CLK2. Here, each of the output buffers includes a pair of inverters, and the inverter 121 controlled by the second clock signal CLK2 is shared by the individual output buffers.

Hereinafter, the operation of the PU 110 according to the present invention will be described.

At the outset, once a K bit instruction is transmitted to the instruction register 111, the instruction decoder 112 decodes the K bit instruction and produces a variety of control signals. The control signals are transmitted to the register files 113, select and control register files appropriate for the input K bit instruction, and then are transmitted to the load/store unit 114. The control signals input to the load/store unit 114 are used to control the transmission of data to and from the external memory.

Also, the instruction decoder 112 produces control signals for controlling K bit and K/2 operation logic units. By using a combination of the control signals, only needed operation logic subunits are enabled.

For example, once the instruction decoder 112 produces the adder enable signal ADDEN and the adder operation signal ADDOP, only the K bit adder 115 is enabled, while the remaining operation logic units (i.e., the K bit variable shifter 117 and the K/2 bit multiplier 119) are disabled. In another case, once the instruction decoder 112 produces the shifter enable signal SHEN and the shifter operation signal SHOP, only the K bit variable shifter 117 is enabled. In still another case, once the instruction decoder 112 produces the multiplier enable signal MULEN and the multiplier operation signal MULOP, only the K/2 bit multiplier 119 is enabled. According to the present invention as stated above, by using a combination of the operation logic control signals ADDEN, SHEN, MULEN, ADDOP, SHOP, and MULOP, only needed operation logic units are enabled, while all other operation logic units are disabled. Thus, power dissipation is reduced.

Subsequently, the K bit×L register files 113, which are connected to the load/store unit 114, receive external data from the external memory or transmit internal data to the external memory according to control signals (refer to DIN and DOUT). Also, the register files 113 supply data required for execution of instructions, receive result data of the execution of the instructions from the operation logic units, and store the result data. Besides, the register files 113 receive or transmit input/output data of all the instructions excluding external memory access instructions Load and Store.

Herein, each of the K bit adder 115, the K bit variable shifter 117, and the K/2 bit multiplier 119 executes an instruction for a cycle, receive K bit data or K/2 bit data suitable for a decoded instruction from the register files 113, executes an operation, and transmits K bit result data to the register files 113. In this process, only one operation logic unit is selected by the instruction and enabled. That is, the operation logic units 115, 117, and 119 are controlled by the K bit instruction bus IB<K−1:0> so that only one operation logic unit is selected and enabled.

In the meantime, energy efficiency can be defined as "performance/total power." That is, the energy efficiency is obtained by dividing the capability of a data path to process data by dissipated power and can be expressed in terms of MIPS/mW. Here, MIPS (million instruction per second), as a typical unit of performance, represents the number of instructions that can be processed per second. In this context, since the parallel data path architecture according to the present invention improves the performance of a process and reduces power dissipation, it achieves high energy efficiency.

Figure 5:
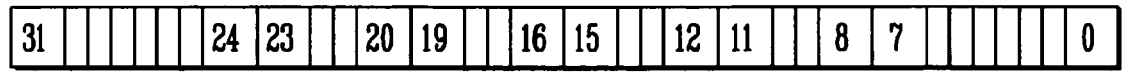
FIG. 5 illustrates an instruction format that can be applied to a parallel data path architecture according to an exemplary embodiment of the present invention.

FIG. 5 illustrates an instruction format that can be applied to a parallel data path architecture according to the present invention.

Referring to FIG. 5, the instruction format includes the following 32-bit instructions.
- IB<31:24>: Opcode
- IB<23:20>: Register File Selection
- IB<19:16>: Destination Register
- IB<15:12>: Source 1 Register
- IB<11:8>: Source 2 Register
- IB<7:0>: Immediate Data In the above-described instruction format, the individual bits are set as follows.
- IB<31:30>: Operation Selection
  - 00: ALU Operation
  - 01: Multiplier Operation
  - 10: Shifter Operation
  - 11: Load/Store Operation
- IB<29>: Load/Stroe EN
  - 0: Load EN
  - 1: Store EN
- IB<28>: Carry In Cin
- IB<27:25>: ALU Function Selection
  - 0000: ADD Function
  - 0010: SUB Function
  - 0100: SUBI Function
  - 1000: OR Function
  - 1010: XOR Function
  - 1100: AND Function
  - 1110: MOV Function
- IB<24>: External/Internal Memory Access Selection
  - 0: Internal Memory Access
  - 1: External Memory Access
- IB<23:22>: Register File Selection
  - 00: First RF
  - 01: Second RF
  - 10: Third RF
  - 11: Fourth RF
- IB<21:20>:
- IB<19:16>: Destination Register
- IB<15:12>: Source 1 Register
- IB<11:8>: Source 2 Register
- IB<7:0>: Immediate Data In conclusion, the present invention provides an N×M PU array, in which a reset signal, a first clock signal, a second clock signal, a K bit instruction bus, K bit data buses, register file selection signals, PU selection signals, register file selection input signals, PU selection input signals, and operation logic control signals are produced using simple instructions, and only necessary units are selected and enabled with the applications of PUs and register files and operation logic units of the PUs by using the above-described signals. As a result, the N×M PU array reduces power dissipation and improves performance of a processor and thus, obtains high energy efficiency. Also, the N×M PU array is highly compatible with RISC instructions by using the instruction format shown in FIG. 5.

As explained thus far, according to the present invention, a plurality of parallel PUs and a plurality of function units of the PUs are controlled by instructions and processed in parallel to improve performance. Also, since only necessary PUs and operation logic units are enabled, power dissipation is reduced to enhance energy efficiency. Further, by use of a simple instruction format, hardware can be programmed as a parallel data path architecture for high energy efficiency, which satisfies both excellent performance and low power dissipation, thus elevating hardware flexibility.

In the drawings and specification, there have been disclosed typical exemplary embodiments of the invention and, although specific terms are employed, they are used in a generic and descriptive sense only and not for purposes of limitation. As for the scope of the invention, it is to be set forth in the following claims. Therefore, it will be understood by those of ordinary skill in the art that various changes in form and details may be made therein without departing from the spirit and scope of the present invention as defined by the following claims.

What is claimed is:

1. A parallel data path architecture, comprising:
a processing unit array including a plurality of processing units, each of the processing units comprising:
a data bus;
an instruction register operable for receiving a reset signal, synchronizing an instruction transmitted through an instruction bus with a first clock signal, and storing the instruction;
an instruction decoder operable for receiving the first clock signal and a second clock signal, decoding the instruction stored by the instruction register, and producing a first control signal, a second control signal, and a third control signal corresponding to the instruction;
register files operable for receiving the reset signal and the first control signal, wherein a register file among said register files is selected and controlled corresponding to the decoded instruction in response to the first control signal;
a load/store unit operable for receiving the first and second clock signals, controlling data transmission to and from an external memory connectable to the data bus in response to the second control signal, and transmitting and receiving data to and from the register files; and
first through third operation logic units that are selectively enabled in response to the third control signal and operable for executing the instruction and outputting results to the register files;
wherein said instruction decoder is further operable for:
outputting processing unit selection (PUSel) signals and register file selection (RFSel) signals,
receiving one of said PUSel signals, via a first feedback line, as a processing unit selection input (PUIN) signal that selectively selects the processing unit to handle the instruction, and
receiving one of said RFSel signals, via a second feedback line, as a register file selection input (RFIN) signal that selectively selects at least one of the register files of said processing unit for access by the external memory;
wherein only the selected processing unit(s) and its/their selected register file(s) are enabled according to the instruction, thereby reducing power consumption and enhancing energy efficiency of the parallel data path architecture.

2. The parallel data path architecture according to claim 1, wherein the RFIN and RFSel signals of the instruction decoder of each of the processing units are controlled by the instruction bus.

3. The parallel data path architecture according to claim 1, wherein the PUIN and PUSel signals of the instruction decoder of each of the processing units are controlled by the instruction bus.

4. The parallel data path architecture according to claim 1, wherein each of the processing units includes a data path that is connected in parallel to the instruction bus and connected to the external memory through the respective data bus.

5. The parallel data path architecture according to claim 1, wherein each of the processing units further includes:
- a RFSel terminal and a PUSel terminal at which the RFSel and PUSel signals are outputted, respectively; and
- a RFIN terminal and a PUIN terminal at which the RFIN and PUIN signals are received, respectively;
- wherein the RFSel terminal and the PUSel terminal are directly electrically connected to the RFIN terminal and the PUIN terminal via the second and first feedback lines, respectively.

6. The parallel data path architecture according to claim 1, wherein
- said away comprises multiple rows and columns each comprising multiple said processing units; and
- all said processing units share the same instruction bus, but have respectively different data buses all connectable to the external memory.

7. The parallel data path architecture according to claim 6, being a Single Instruction, Multiple Data (SIMD) architecture.

* * * * *